US008735724B2

(12) United States Patent
Muraki et al.

(10) Patent No.: US 8,735,724 B2
(45) Date of Patent: May 27, 2014

(54) ELECTRIC EQUIPMENT HAVING INSULATION STRUCTURE AT WELDING PARTS

(75) Inventors: Takahito Muraki, Hitachinaka (JP); Satoru Amou, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 13/274,371

(22) Filed: Oct. 17, 2011

(65) Prior Publication Data

US 2012/0097447 A1  Apr. 26, 2012

(30) Foreign Application Priority Data

Oct. 20, 2010  (JP) ................................. 2010-235036

(51) Int. Cl.
*H01R 4/00* (2006.01)
*H02G 3/06* (2006.01)
*H02G 15/08* (2006.01)

(52) U.S. Cl.
USPC ............................. 174/88 R; 310/45; 310/179

(58) Field of Classification Search
None
See application file for complete search history.

(56) References Cited

U.S. PATENT DOCUMENTS

| | | | |
|---|---|---|---|
| 5,955,810 A | | 9/1999 | Umeda et al. |
| 5,990,610 A | * | 11/1999 | Matsumoto et al. ... 313/477 HC |
| 5,998,903 A | | 12/1999 | Umeda et al. |
| 6,191,508 B1 | * | 2/2001 | Aoki et al. ..................... 310/45 |
| 6,462,453 B1 | * | 10/2002 | Asao et al. ..................... 310/179 |
| 6,936,938 B2 | * | 8/2005 | Ioi ..................................... 310/52 |
| 6,943,466 B2 | * | 9/2005 | Oohashi .......................... 310/45 |

FOREIGN PATENT DOCUMENTS

| | | |
|---|---|---|
| JP | 2000-209802 | 7/2000 |
| JP | 2000-278901 | 10/2000 |
| JP | 2001-54247 | 2/2001 |
| JP | 2003-264951 | 9/2003 |
| JP | 2006-217679 | 8/2006 |
| JP | 2009-112159 | 5/2009 |
| WO | WO 98/54823 | 12/1998 |

OTHER PUBLICATIONS

Communication mailed Mar. 4, 2014, in connection with Japanese Patent Application No. 2010-235036, 3 pages; Japanese Patent Office, Japan.

* cited by examiner

*Primary Examiner* — Jayprakash N Gandhi
*Assistant Examiner* — Dion Ferguson
(74) *Attorney, Agent, or Firm* — Antonelli, Terry, Stout & Kraus, LLP.

(57) ABSTRACT

An electric equipment of the present invention has an insulation structure at a welding part formed by joining end parts of a plurality of conductors with each other, the welding part having a rectangular cross section and being coated with an insulating coating, in which the insulating coating is voidless and has a coating thickness of 50 to 1000 μm in the welding part, and in which an edge cover ratio of the insulating coating is 20% or more.

According to the present invention, the insulation performance of the insulation structure in which the welding part formed by joining the end parts of the plurality of conductors with each other can be improved, the welding part having a rectangular cross section and being coated with an insulating coating, and a highly reliable electric equipment can be provided.

4 Claims, 2 Drawing Sheets

ELECTRIC EQUIPMENT HAVING INSULATION STRUCTURE AT WELDING PARTS

CLAIM OF PRIORITY

The present application claims priority from Japanese Patent application serial No. 2010-235036, filed on Oct. 20, 2010, the content of which is hereby incorporated by reference into this application.

BACKGROUND OF THE INVENTION

1. Field of the Invention

The present invention relates to electric equipment having an insulation structure at welding parts.

2. Description of Related Art

In Patent Document 1 (International Publication WO No. 98/54823), an alternating-current generator for a vehicle is disclosed in which a number of conductor segments with a square cross section are inserted to slots, and thereafter each pair of end parts of the respective conductor segments are joined with each other to form a stator coil.

However, in the alternating-current generator for the vehicle, a resin coating in a front end portion in an axial direction of a coil end is in a state of being peeled off because it is required to form a connection part by joining front end parts of a conductor segment pair to the front end portion in the axial direction of the coil end of the stator coil. Therefore, there was a room for improvement with respect to the insulation performance of the stator coil.

With the aim of improving the insulation performance of the connection part (welding part), a technology is disclosed in which a cap is arranged in the welding part and the welding part is embedded by insulation resin in Patent Document 2 (Japanese Patent Application Laid-Open No. 2000-209802).

Also, a technology is disclosed in which insulation treatment is performed using powder resin or liquid insulating varnish with a similar aim in Patent Document 3 (Japanese Patent Application Laid-Open No. 2001-54247).

SUMMARY OF THE INVENTION

According to an aspect of the present invention, an insulation structure at a welding part formed by joining end parts of a plurality of conductors with each other, the welding part having a rectangular cross section and being coated with an insulating coating, in which the insulating coating is voidless and has a coating thickness of 50 to 1000 μm on the welding part, and an edge cover ratio of the insulating coating is 20% or more.

According to the present invention, an insulation performance of the insulation structure at the welding part formed by joining the end parts of the plurality of conductors with each other, the welding part having a rectangular cross section and being coated with the insulating coating can be improved, and a highly reliable electric equipment can be provided.

DETAILED DESCRIPTION OF THE PREFERRED EMBODIMENTS

Figure 1:
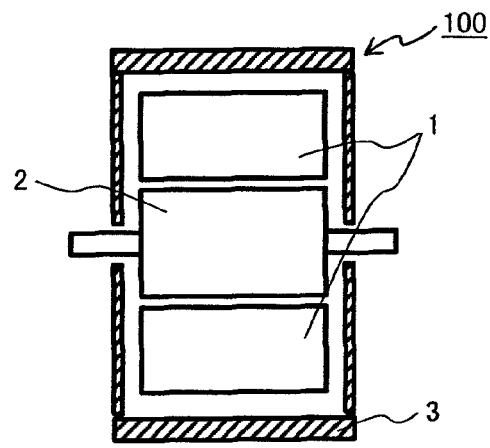
FIG. 1 is a schematic cross-sectional view showing a rotary electric machine of an example.

The present invention relates to an insulation structure of a welding part (insulation structure at welding parts) in which end parts of two electric conductors (they may be referred to simply as conductors.) with a square cross section (rectangular cross section) are joined with each other and are covered with an organic insulating coating (it may be referred to simply as an insulating coating.), and relates to an electric equipment having the insulation structure at welding parts and a method for manufacturing the same.

The object of the present invention is to improve an insulation performance in an insulation structure at a welding part in which the end parts of the plurality of conductors are joined with each other, the welding part having the rectangular cross section and being coated with the insulating coating, and to provide the highly reliable electric equipment.

In the present specification, the electric equipment includes a stator for a rotary electric machine and the rotary electric machine, but the electric equipment is not limited to them and includes a component and an apparatus (product) having the welding part. Further, the present invention includes forming of an insulating coating of an insulating coating peeled part of an electric conductor with a rectangular cross section.

As a result of intensive studies, the present inventors found out that the welding part of the electric conductor with the square cross section was preferable to be covered with an organic insulating coating which was voidless, had a coating thickness of 50 to 1000 μm, and had an edge cover ratio of 20% or more. It is more preferable that the coating thickness is within the range of 50 to 500 μm.

Here, the coating thickness of the organic insulating coating is a coating thickness in the welding part.

Also, in the present specification, the word "voidless" means a state in which a bubble with 15 μm or more diameter is not included in the organic insulating coating. When the bubble with 15 μm or more diameter is included, partial discharging may occur which may exert an adverse effect on the insulation performance.

Below, an insulation structure of a welding part, electric equipment having it, and a method for manufacturing the same in relation with an aspect of the present invention will be described.

The insulation structure of the welding part is obtained by covering the welding part with an insulating coating, the welding part being formed by joining end parts of a plurality of conductors with each other and having a rectangular cross section. Also, the insulating coating is voidless with 50 to 1000 μm coating thickness in the welding part, and the edge cover ratio of the insulating coating is 20% or more.

The electric equipment has an insulation structure, that is, the insulation structure at welding parts, in which a welding part where end parts of a plurality of conductors are joined with each other, the welding part having a rectangular cross section is covered with an insulating coating.

In the electric equipment, it is preferable that the heat-resisting temperature of insulation of an insulating coating measured in accordance with JIS C 4003 is 155° C. or above.

It is preferable that the insulating coating is of an epoxy resin containing inorganic filler with 3 to 7 μm average grain size by 40 to 55 wt %.

It is preferable that the inorganic filler is of calcium carbonate.

It is preferable that dielectric breakdown voltage of the insulating coating is 5 kV or above.

A method for manufacturing the electric equipment includes the steps of coating a welding part with a liquid varnish, the welding part formed by joining end parts of a plurality of conductors with each other and having a rectangular cross section, and curing the varnish to form an insulating coating, in which a viscosity of the varnish before coating is 12 to 30 Pa·s at 25° C., 1.5 to 3 Pa·s at 70° C., and 100 to 500 Pa·s at 130° C.

It is preferable that the varnish contains an epoxy resin.

It is preferable that a gel time of the varnish measured in accordance with JIS C 2105 is 1.5 to 3 min at 150° C.

In the method for manufacturing the electric equipment, it is preferable that the coating is performed by immersing the welding part in the varnish. The immersing is performed by lowering the welding part relative to the liquid varnish with the welding part being directed downward in the vertical direction, and immersing the welding part in the varnish. The immersing time depends on the shape of the welding part, and is preferable to be 1 to 10 min. Thereafter, the electric equipment is lifted up relative to the varnish.

In the method for manufacturing the electric equipment, it is preferable that the curing is performed with the welding part coated with the varnish being directed upward in the vertical direction.

Below, further details will be described.

With respect to resin used for forming the above insulating coating, it is preferable to use an epoxy resin from the viewpoint of the heat-resisting property. With respect to the epoxy resin, both of a solvent type in which resin is diluted in a solvent and a non-solvent type without dilution by a solvent can be employed, but the non-solvent type epoxy resin in which swelling by volatilization of solvent does not occur in the curing is more preferable.

The non-solvent type epoxy resin is not particularly limited, and an acid anhydride cured epoxy resin, a dicyandiamide cured epoxy resin, a single cured epoxy resin by catalyst such as imidazole, and the like can be used. However, the acid anhydride cured epoxy resin is more preferable from the viewpoint that the curing temperature is lower and that its availability is easy.

As examples of the non-solvent type acid anhydride cured epoxy resin, KE-573D made by Hitachi Chemical Co., Ltd., TVB2643 made by KYOCERA Chemical Corporation, K-8841 and E-530 made by SOMAR Corporation, and the like can be cited, but it is not particularly limited to them.

The inorganic filler added is not particularly limited, and a silicon oxide, an aluminum oxide, an aluminum hydroxide, talc, a calcium carbonate and the like can be used, but the calcium carbonate is preferable from the viewpoint of the low cost. Also, it is preferable that the inorganic filler is performed with a surface treatment by a carboxylic acid, a silane coupling agent and the like from the viewpoint of improving the wettability with respect to resin.

With respect to the grain size of the inorganic filler, the average grain size of 3 to 7 μm is preferable from such viewpoints that its availability is easy, that the viscosity preferable for forming an insulating coating can be easily obtained, and that its cost is low.

As examples of the calcium carbonate as the inorganic filler, WHITONB made by Shiraishi Calcium Kaisha. Ltd.,
SUNLIGHT SL-100 and WHITESEAL WS-K made by Takehara Kagaku Kogyo Co., Ltd., and the like can be cited, but it is not particularly limited to them.

The addition amount of the inorganic filler is preferably 40 to 55 wt %, and more preferably 45 to 50 wt %.

The welding part of the electric conductor with the square cross section has the organic insulating coating, and the organic insulating coating is voidless with 50 to 1000 μm coating thickness and with 20% or more edge cover ratio.

The stator may be performed with a fixing treatment by a conventional method using a fixing varnish between coils, between coil sheet-like insulation members, and/or between a coil and a stator core.

FIG. 1 is a schematic cross-sectional view showing a rotary electric machine of an example. The rotary electric machine is a kind of electric equipment.

In the present drawing, the rotary electric machine 100 is configured including a stator 1, a rotor 2, a housing 3 and the like.

Figure 2:
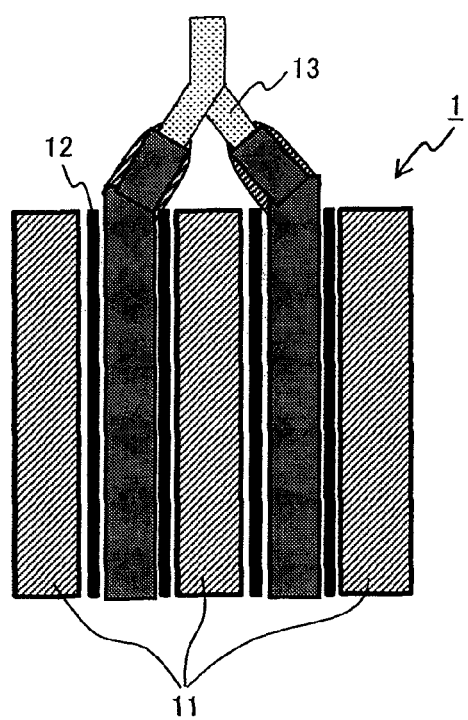
FIG. 2 is a schematic cross-sectional view showing a stator of the example.

FIG. 2 is a schematic cross-sectional view showing the stator of the example. The stator is a kind of electric component or electric equipment.

In the present drawing, the stator 1 is configured including an annular stator core 11, a plurality of sheet-like insulation members 12 and a number of conductors 13.

Below, the present invention will be described using the examples, but the present invention is not limited by the examples.

EXAMPLE 1

An example of a stator will be described below.

Figure 3:
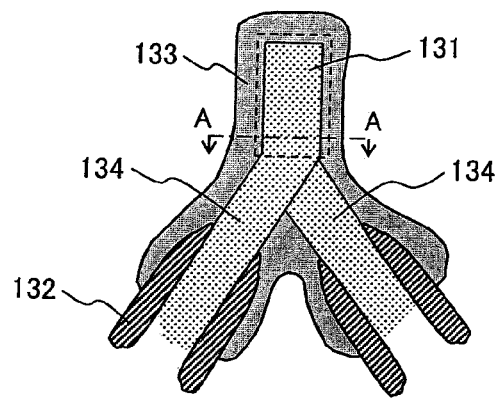
FIG. 3 is a schematic vertical cross-sectional view showing an insulation structure at a welding part of the example.

FIG. 3 is a vertical cross-sectional view enlargingly showing an insulation structure at a welding part in the stator of the example.

The insulation structure at the welding part is configured including a conductor welding part 131 (it may be simply referred to also as a welding part.), an enamel coat 132 and an organic insulating coating 133.

The conductor welding part 131 represents an entire conductor of a portion where two conductors (lead wires) are tightly stuck (welded) and electrically connected to each other. That is, the conductor welding part 131 represents the conductor of a portion surrounded by a dash line in the drawing.

The enamel coat 132 is for coating the conductor 134 and they configure an enameled wire.

The enameled wire is an electric cable obtained by baking an insulation varnish configured of a natural resin or a synthetic resin on the conductor 134. As examples of the conductor 134, copper, aluminum, nickel-plated copper, nickel, silver and the like can be cited. As the natural resin or the synthetic resin configuring the insulation varnish, a formal resin, a polyurethane resin, polyester-imide resin, a polyamide-imide resin, a polyimide resin and the like can be cited, and the insulation varnish can be coated on the conductor 134 once or plural times. Also, an additive may be added to these resins in order to improve the lubricity and the insulation performance of these resins.

Figure 5:
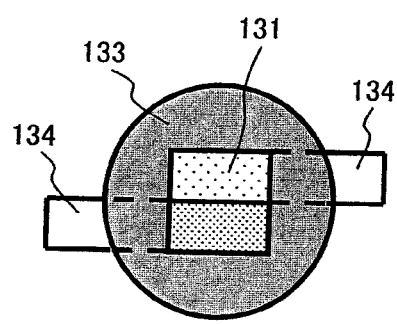
FIG. 5 is a cross-sectional view taken from line A-A of FIG. 3.

FIG. 5 is a cross-sectional view taken from line A-A of FIG. 3.

In the present drawing, the enamel coat 132 and the organic insulating coating 133 are shown omitting the lower parts.

In the present example, the epoxy resin for the organic insulating coating was processed into a varnish by adding calcium carbonate (WHITESEAL WS-K made by Takehara Kagaku Kogyo Co., Ltd.) to an epoxy resin (E-530 made by SOMAR Corporation) by 50 wt %, mixing it for 5 min using Super Mixer (made by AS ONE Corporation), and degassing it for 2 min.

The viscosity of the varnish (before coating) was measured using an E-type viscometer. As a result, the viscosity showed 27.6 Pa·s at 25° C., 2.0 Pa·s at 70° C., and 420 Pa·s at 130° C. Also, the gel time (gelation time) at 150° C. measured in accordance with JIS C 2103 was 2 min.

The varnish was transferred to a container made of a stainless steel, and the conductor welding part 131 of a stator coil was directed downward in the vertical direction, was immersed for 3 min in the epoxy resin for the organic insulating coating, and was thereafter lifted up. Also, after the coated part is reversed so as to be directed upward in the vertical direction, it was put in a hot air circulation type thermostat with 160° C. furnace temperature. The surface temperature of the stator reached 150° C. in 100 min after putting it in. Curing was performed by maintaining the stator for 30 min after the surface temperature of the stator reached 150° C. so that the surface temperature did not become below 150° C., and the power source of the thermostat was thereafter stopped for spontaneous cooling.

Because the curing was performed with the coating part being directed upward in the vertical direction, the organic insulating coating of the conductor of the stator obtained can coat the conductor approximately 5 mm longer than the coating depth (the depth of immersion of the conductor welding part 131 and the conductor 134). Because the insulating coating becomes long, the method is preferable from the viewpoint of improving the insulation performance around the conductor welding part 131.

A dielectric breakdown voltage in the organic insulating coating of the stator of the present example was measured under the condition of applying AC of 50 Hz at the boosting speed of 0.5 kV/min. As a result of it, the dielectric breakdown voltage was 11 kV which was excellent.

Also, the organic insulating coating of the stator of the present example has a heat-resisting temperature of insulation of 155° C. or above, the temperature being measured in accordance with JIS C 4003.

With respect to the organic insulating coating of the stator of the present example, the conductor welding part 131 coated with the organic insulating coating was cut, and the coating thickness was measured by observation under a microscope. As the result of it, the minimum value of the coating thickness was 231 μm, and the maximum value of the coating thickness was 730 μm.

Here, the edge cover ratio will be defined.

Figure 4:
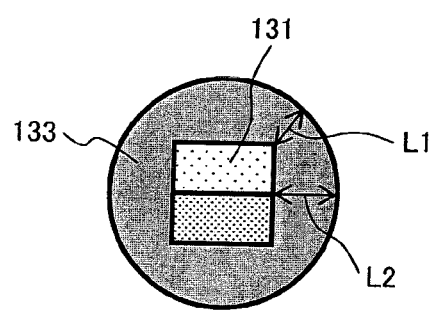
FIG. 4 is a schematic transverse cross-sectional view showing a definition of an edge cover ratio.

FIG. 4 schematically shows the cross section of the welding part.

In the present drawing, L1 is an average coating thickness of an edge part, and L2 is an average coating thickness of a trunk part. L1/L2×100(%) is defined to be the edge cover ratio.

Here, the coating thickness is defined to be the distance between a point where a straight line extending radially from a base point of a graphical center of gravity of a contour shape of the organic insulating coating 133 in a cross section orthogonal to a longitudinal direction of the conductor crosses a periphery of the contour shape and a point where the straight line crosses the periphery of the contour line of the conductor welding part 131 in the cross section. When the straight line is moved parallelly in the longitudinal direction of the conductor within the range the organic insulating coating 133 covers the conductor welding part 131, the coating thickness is measured in a similar manner, and a value averaged in the range is defined to be the average coating thickness.

The average coating thickness L1 of the edge part can be deemed to be a minimum value of the average coating thickness defined above. Also, the average coating thickness L2 of the trunk part can be deemed to be a maximum value of the average coating thickness defined above.

In the present example, the edge cover ratio was 39%.

EXAMPLE 2

The stator manufactured in Example 1 was performed with a fixing treatment by a drip impregnation method using a liquid epoxy varnish, was shrinkage fitted to the housing, was incorporated thereafter with the rotor, and was assembled to the rotary electric machine by a conventional procedure.

COMPARATIVE EXAMPLE 1

Using a stator of a type same with the example 1, an insulating coating was formed with an epoxy resin for an organic insulating coating described below.

The epoxy resin for the organic insulating coating was processed into a varnish by adding calcium carbonate (WHITESEAL WS-K made by Takehara Kagaku Kogyo Co., Ltd.) to the epoxy resin (E-530 made by SOMAR Corporation) by 30 wt %, mixing it for 5 min using Super Mixer (made by AS ONE Corporation), and degassing it for 2 min.

The viscosity of the varnish was measured using the E-type viscometer. As a result of it, the viscosity showed 10 Pa·s at 25° C., 0.3 Pa·s at 70° C., and 420 Pa·s at 130° C. Also, the gel time at 150° C. measured in accordance with JIS C 2103 was 2 min.

The varnish was transferred to the container made of the stainless steel, and the conductor welding part 131 of the stator coil was directed downward in the vertical direction, was immersed for 3 min in the epoxy resin for organic insulating coating, and was thereafter lifted up. Also, after the coated part is reversed to be directed upward in the vertical direction, it was put in the hot air circulation type thermostat with 160° C. furnace temperature. The surface temperature of the stator reached 150° C. in 100 min after putting it in. Curing was performed by maintaining the stator for 30 min after the surface temperature of the stator reached 150° C. so that the surface temperature did not become below 150° C., and the power source of the thermostat was thereafter stopped for spontaneous cooling.

The organic insulating coating of the stator conductor obtained did not coat the edge part of the welding part, and the coating part did not show the insulation performance.

EXAMPLE 3

With respect to a flat type enameled wire whose enamel coating in one end had been peeled off, an insulating coating was formed with an epoxy resin for an organic insulating coating.

The epoxy resin for the organic insulating coating was processed into a varnish by adding calcium carbonate (WHITESEAL WS-K made by Takehara Kagaku Kogyo Co., Ltd.) to the epoxy resin (E-530 made by SOMAR Corporation) by 50 wt. %, mixing it for 5 min using Super Mixer (made by AS ONE Corporation), and degassing it for 2 min.

The viscosity of the varnish was measured using the E-type viscometer. As a result of it, the viscosity showed 27.6 Pa·s at 25° C., 2.0 Pa·s at 70° C., and 420 Pa·s at 130° C. Also, the gel time at 150° C. measured in accordance with JIS C 2103 was 2 min.

After the varnish was coated on the conductor welding part 131 of the stator by the dip method, the stator was heat-cured for 30 min in the hot air type thermostat at 150° C., and the organic insulating coating was obtained.

The dielectric breakdown voltage in the organic insulating coating of the stator of the present example was measured under the condition of applying AC of 50 Hz at the boosting speed of 0.5 kV/min. As a result of it, the dielectric breakdown voltage was 11 kV which was excellent.

Also, the heat-resisting temperature of insulation of the organic insulating coating of the stator of the present example measured in accordance with JIS C 4003 was 155° C. or above.

With respect to the organic insulating coating of the stator of the present example, the conductor welding part 131 coated with the organic insulating coating was cut, and the coating thickness was measured by observation under the microscope. As a result of it, the minimum value of the coating thickness was 220 μm, and the maximum value of the coating thickness was 730 μm. Also, the edge cover ratio was 32%.

EXAMPLE 4

With respect to a flat type enameled wire whose enamel coating in one end had been peeled off, an insulating coating was formed with an epoxy resin for an organic insulating coating.

The epoxy resin for organic insulating coating was processed into a varnish by adding calcium carbonate (WHITE-SEAL WS-K made by Takehara Kagaku Kogyo Co., Ltd.) to the epoxy resin (E-530 made by SOMAR Corporation) by 45 wt %, mixing it for 5 min using Super Mixer (made by AS ONE Corporation), and degassing it for 2 min.

The viscosity of the varnish was measured using the E-type viscometer. As a result of it, the viscosity showed 14 Pa·s at 25° C., 1.0 Pa·s at 70° C., and 420 Pa·s at 130° C. Also, the gel time at 150° C. measured in accordance with JIS C 2103 was 2 min.

After the varnish was coated on the conductor welding part 131 of the stator by the dip method, the stator was heat-cured for 30 min in the hot air type thermostat at 150° C., and the organic insulating coating was obtained.

The dielectric breakdown voltage in the organic insulating coating of the stator of the present example was measured under the condition of applying AC of 50 Hz at the boosting speed of 0.5 kV/min. As a result of it, the dielectric breakdown voltage was 5 kV which was excellent.

Also, the heat-resisting temperature of insulation of the organic insulating coating of the stator of the present example measured in accordance with JIS C 4003 was 155° C. or above.

With respect to the organic insulating coating of the stator of the present example, the conductor welding part 131 coated with the organic insulating coating was cut, and the coating thickness was measured by observation under the microscope. As the result of it, the minimum value of the coating thickness was 75 μm, and the maximum value of the coating thickness was 550 μm. Also, the edge cover ratio was 21%.

COMPARATIVE EXAMPLE 2

With respect to a flat type enameled wire whose enamel coating in one end had been peeled off, an insulating coating was formed with an epoxy resin for organic insulating coating.

The epoxy resin for organic insulating coating was processed into varnish by adding calcium carbonate (WHITE-SEAL WS-K made by Takehara Kagaku Kogyo Co., Ltd.) to the epoxy resin (E-530 made by SOMAR Corporation) by 30 wt %, mixing it for 5 min using Super Mixer (made by AS ONE Corporation), and degassing it for 2 min.

The viscosity of the varnish was measured using the E-type viscometer. As a result of it, the viscosity showed 10 Pa·s at 25° C., 0.3 Pa·s at 70° C., and 420 Pa·s at 130° C. Also, the gel time at 150° C. measured in accordance with JIS C 2103 was 2 min.

After the varnish was coated on the conductor welding part 131 of the stator by the dip method, the stator was heat-cured for 30 min in the hot air type thermostat at 150° C., and the organic insulating coating was obtained.

The dielectric breakdown voltage of the organic insulating coating of the present comparative example was measured under the condition of applying AC of 50 Hz at the boosting speed of 0.5 kV/min. As a result of it, the organic insulating coating of the present comparative example did not coat the edge part of the enamel peeled part of the flat type enameled wire, and did not show the insulation performance.

In the above examples, the stator (electric equipment) having the insulating structure at the welding part formed by joining end parts of two conductors with each other, the welding part having a rectangular cross section and being coated with the organic insulating coating and the rectangular lead wire whose insulation coating of the end part is peeled off have been described, but the present invention is not limited to them but is applicable to the welding part where end parts of the plurality of conductors are joined with each other, having a rectangular cross section, and includes electric equipment having the insulating structure at the welding part.

According to the present invention, because a powder resin is not used for the insulating coating of the welding part, generation of the dust can be reduced and the working environment can be improved.

EXPLANATION OF NUMERALS

1: Stator, 2: Rotor, 3: Housing, 11: Stator core, 12: Sheet-like insulation members, 13: Conductors, 131: Conductor welding part, 132: Enamel coat, 133: Organic insulating coating, 134: Conductor.

What is claimed is:
1. Electric equipment having an insulation structure at a welding part formed by joining end parts of a plurality of conductors with each other, the welding part having a rectangular cross section and being coated with an insulating coating,
   wherein the insulating coating is voidless and has a coating thickness of 50 to 1000 μm on the welding part,
   wherein an edge cover ratio of the insulating coating is 20% or more, and
   wherein the insulating coating is formed of an epoxy resin containing an inorganic filler with 3 to 7 μm average grain size by 40 to 55 wt %.
2. The electric equipment according to claim 1,
   wherein a heat-resisting temperature of insulation of the insulating coating measured in accordance with JIS C 4003 is 155° C. or above.
3. The electric equipment according to claim 1,
   wherein the inorganic filler is formed of calcium carbonate.
4. The electric equipment according to claim 1,
   wherein dielectric breakdown voltage of the insulating coating is 5 kV or above.

* * * * *